US012353951B1

(12) United States Patent
Drzymala et al.

(10) Patent No.: US 12,353,951 B1
(45) Date of Patent: Jul. 8, 2025

(54) BIOPTIC INDICIA READER ASSEMBLY WITH AN ACCESSORY STRUCTURE HAVING A CROSSBAR OVER THE BIOPTIC INDICIA READER

(71) Applicant: ZEBRA TECHNOLOGIES CORPORATION, Lincolnshire, IL (US)

(72) Inventors: Mark Drzymala, Saint James, NY (US); Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/737,818

(22) Filed: Jun. 7, 2024

(51) Int. Cl.
G06K 7/10 (2006.01)

(52) U.S. Cl.
CPC .................................. *G06K 7/1096* (2013.01)

(58) Field of Classification Search
None
See application file for complete search history.

*Primary Examiner* — Suezu Ellis
(74) *Attorney, Agent, or Firm* — Yuri Astvatsaturov

(57) ABSTRACT

An example bioptic indicia reader assembly includes a perimeter frame, a bioptic indicia reader positioned within and supported by the perimeter frame, and an accessory structure. The accessory structure includes a vertically oriented first post, a vertically oriented second post spaced apart from the first post, and an accessory crossbar extending over the bioptic indicia reader and transverse to the first post and the second post. The first post and the second post each include a proximal end configured to be removably secured to the perimeter frame and the proximal end of the first post and the proximal end of the second post are positioned within a footprint of the perimeter frame.

28 Claims, 12 Drawing Sheets

BIOPTIC INDICIA READER ASSEMBLY WITH AN ACCESSORY STRUCTURE HAVING A CROSSBAR OVER THE BIOPTIC INDICIA READER

BACKGROUND

Bioptic indicia readers, such as bioptic barcode readers in retail applications, could benefit from the addition of various components positioned above the bioptic indicia readers, such as vision cameras, barcode reading cameras, RFID readers, displays, a host computer, payment terminals, receipt printers, etc. However, these components can have significant weight and can require significant structural support. In addition, it would be beneficial to provide the structural support required for these components without affecting the footprint of the bioptic indica reader, so that the requirements for installation of the bioptic indicia reader into a workstation are not affected.

SUMMARY

In an embodiment, the present invention is a bioptic indicia reader assembly, including a perimeter frame, a bioptic indicia reader positioned within and supported by the perimeter frame, and an accessory structure. The accessory structure includes a vertically oriented first post, a vertically oriented second post spaced apart from the first post, and an accessory crossbar extending over the bioptic indicia reader and transverse to the first post and the second post. The first post and the second post each include a proximal end configured to be removably secured to the perimeter frame and the proximal end of the first post and the proximal end of the second post are positioned within a footprint of the perimeter frame.

In a variation of this embodiment, the proximal end of the first post is received in a first socket formed at a first corner of the perimeter frame and the proximal end of the second post is received in a second socket formed at a second corner of the perimeter frame.

In another variation of this embodiment, the accessory crossbar includes a camera.

In another variation of this embodiment, the camera has a field-of-view that encompasses at least one of: a portion of a product scanning region of the bioptic indicia reader; an area located to a side of the bioptic indicia reader assembly; and/or an area located to a front of the bioptic indicia reader assembly.

In another variation of this embodiment, the bioptic indicia reader assembly includes a display mounted to the accessory structure and positioned above the bioptic indicia reader.

In another variation of this embodiment, the accessory crossbar is secured to a distal end of the first post and to a distal end of the second post.

In another variation of this embodiment, an overall width of the accessory structure is greater than an overall width of the bioptic indicia reader and the accessory crossbar extends beyond the footprint of the perimeter frame.

In another variation of this embodiment, the accessory structure includes a crossbar extending between and secured to a distal end of the first post and a distal end of the second post and a vertically oriented third post extending from the crossbar and having a proximal end secured to the crossbar. The accessory crossbar is secured to a distal end of the third post.

In another variation of this embodiment, the accessory crossbar includes a first accessory bar secured to and extending from a distal end of the first post and a second accessory bar secured to and extending from a distal end of the second post. The first accessory bar extends outside of the footprint of the perimeter frame and the second accessory bar is spaced apart from the first accessory bar and extends outside of the footprint of the perimeter frame.

In another embodiment, the present invention is a bioptic indicia reader assembly including a perimeter frame, a bioptic indicia reader positioned within and supported by the perimeter frame, and an accessory structure. The accessory structure includes a vertically oriented first post, a vertically oriented second post spaced apart from the first post, and an accessory crossbar extending over the bioptic indicia reader and transverse to the first post and the second post. A center of gravity of the accessory structure is located generally along a longitudinal centerline of the bioptic indicia reader and within a footprint of an upper housing portion of a housing of the bioptic indicia reader.

In a variation of this embodiment, the first post and the second post each include a proximal end configured to be removably secured to the perimeter frame and the proximal end of the first post and the proximal end of the second post are positioned within a footprint of the perimeter frame.

In another variation of this embodiment, the proximal end of the first post is received in a first socket formed at a first corner of the perimeter frame and the proximal end of the second post is received in a second socket formed at a second corner of the perimeter frame.

In another variation of this embodiment, the accessory crossbar includes a camera.

In another variation of this embodiment, the camera has a field-of-view that encompasses at least one of: a portion of a product scanning region of the bioptic indicia reader; an area located to a side of the bioptic indicia reader assembly; and/or an area located to a front of the bioptic indicia reader assembly.

In another variation of this embodiment, the bioptic indicia reader assembly includes a display mounted to the accessory structure and positioned above the bioptic indicia reader.

In another variation of this embodiment, the accessory crossbar is secured to a distal end of the first post and to a distal end of the second post.

In another variation of this embodiment, the accessory crossbar extends beyond the footprint of the perimeter frame.

In another variation of this embodiment, the accessory structure includes a crossbar extending between and secured to a distal end of the first post and a distal end of the second post. A vertically oriented third post extends from the crossbar and has a proximal end secured to the crossbar and the accessory crossbar is secured to a distal end of the third post.

In another variation of this embodiment, the accessory structure includes a first accessory bar secured to and extending from a distal end of the first post and a second accessory bar secured to and extending from a distal end of the second post. The first accessory bar extends outside of the footprint of the perimeter frame and the second accessory bar is spaced apart from the first accessory bar and extends outside of the footprint of the perimeter frame.

In another embodiment, the present invention is a bioptic indicia reader assembly including a perimeter frame, a bioptic indicia reader positioned within and supported by the perimeter frame, and an accessory structure. The accessory structure includes a vertically oriented first post, a vertically oriented second post spaced apart from the first post, and an accessory crossbar extending over the bioptic indicia reader and transverse to the first post and the second post. An overall width of the accessory structure is greater than an overall width of the bioptic indicia reader.

In a variation of this embodiment, the first post and the second post each include a proximal end configured to be removably secured to the perimeter frame and the proximal end of the first post and the proximal end of the second post are positioned within a footprint of the perimeter frame.

In another variation of this embodiment, the proximal end of the first post is received in a first socket formed at a first corner of the perimeter frame and the proximal end of the second post is received in a second socket formed at a second corner of the perimeter frame.

In another variation of this embodiment, the accessory crossbar includes a camera.

In another variation of this embodiment, the camera has a field-of-view that encompasses at least one of: a portion of a product scanning region of the bioptic indicia reader; an area located to a side of the bioptic indicia reader assembly; and/or an area located to a front of the bioptic indicia reader assembly.

In another variation of this embodiment, the bioptic indicia reader assembly includes a display mounted to the accessory structure and positioned above the bioptic indicia reader.

In another variation of this embodiment, the accessory crossbar is secured to a distal end of the first post and to a distal end of the second post.

In another variation of this embodiment, the accessory structure includes a crossbar extending between and secured to a distal end of the first post and a distal end of the second post. A vertically oriented third post extends from the crossbar and has a proximal end secured to the crossbar and the accessory crossbar is secured to a distal end of the third post.

In another variation of this embodiment, the accessory structure includes a first accessory bar secured to and extending from a distal end of the first post and a second accessory bar secured to and extending from a distal end of the second post. The first accessory bar extends outside of a footprint of the perimeter frame and the second accessory bar is spaced apart from the first accessory bar and extends outside of the footprint of the perimeter frame.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
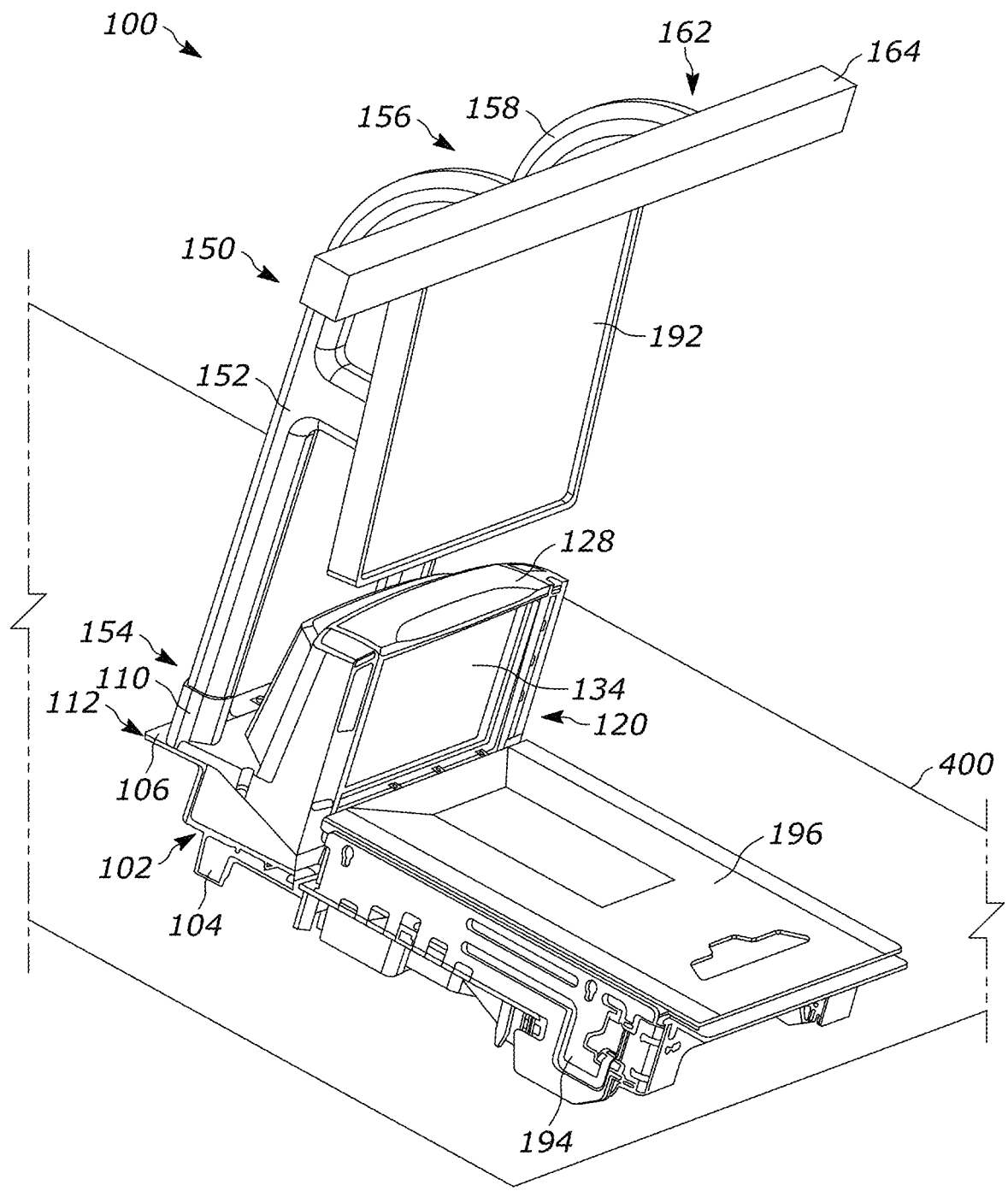
FIG. 1 illustrates a perspective view of a first example bioptic indicia reader assembly with a first example accessory structure.
Figure 2:
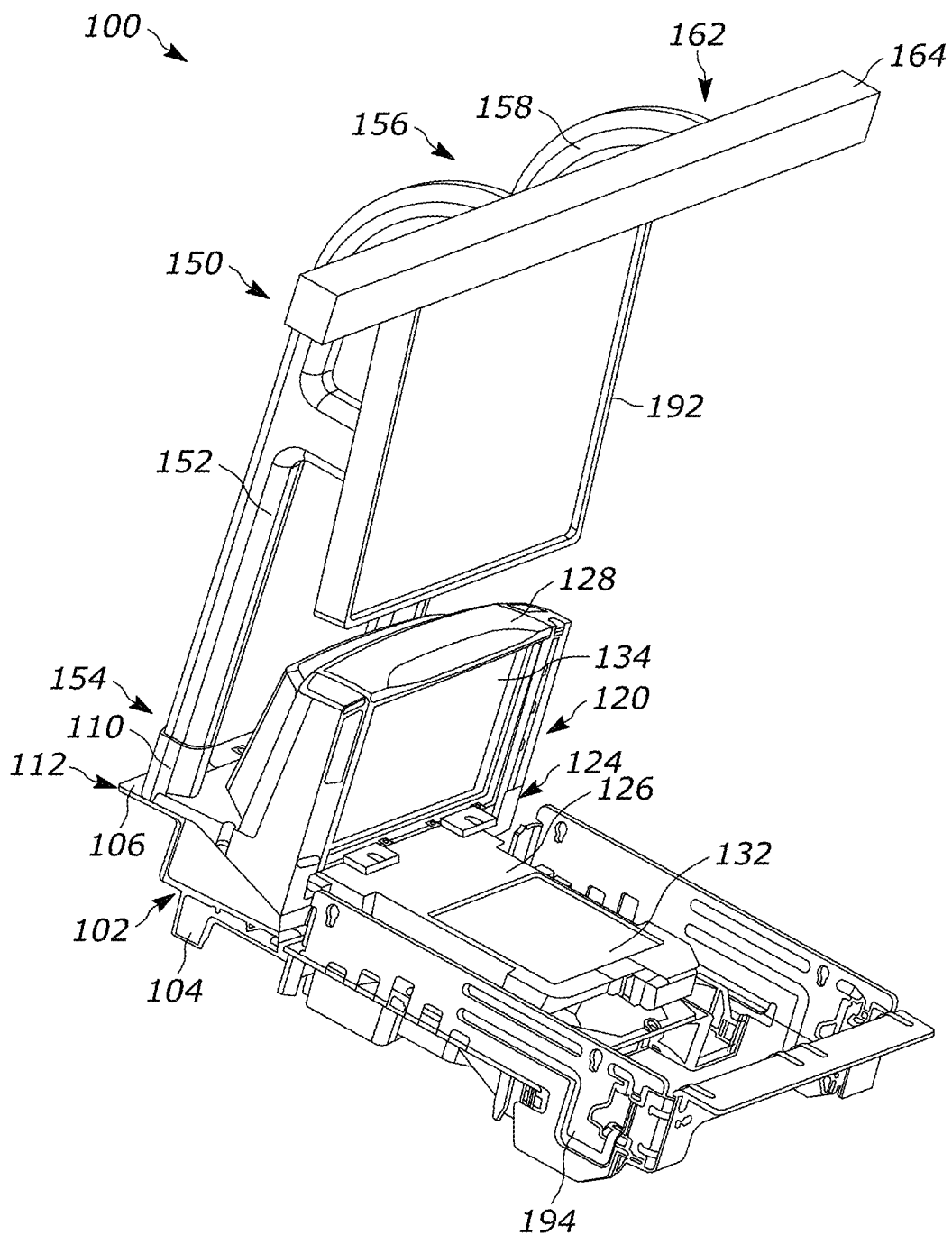
FIG. 2 illustrates the bioptic indicia reader assembly of FIG. 1 with the platter removed.
Figure 3:
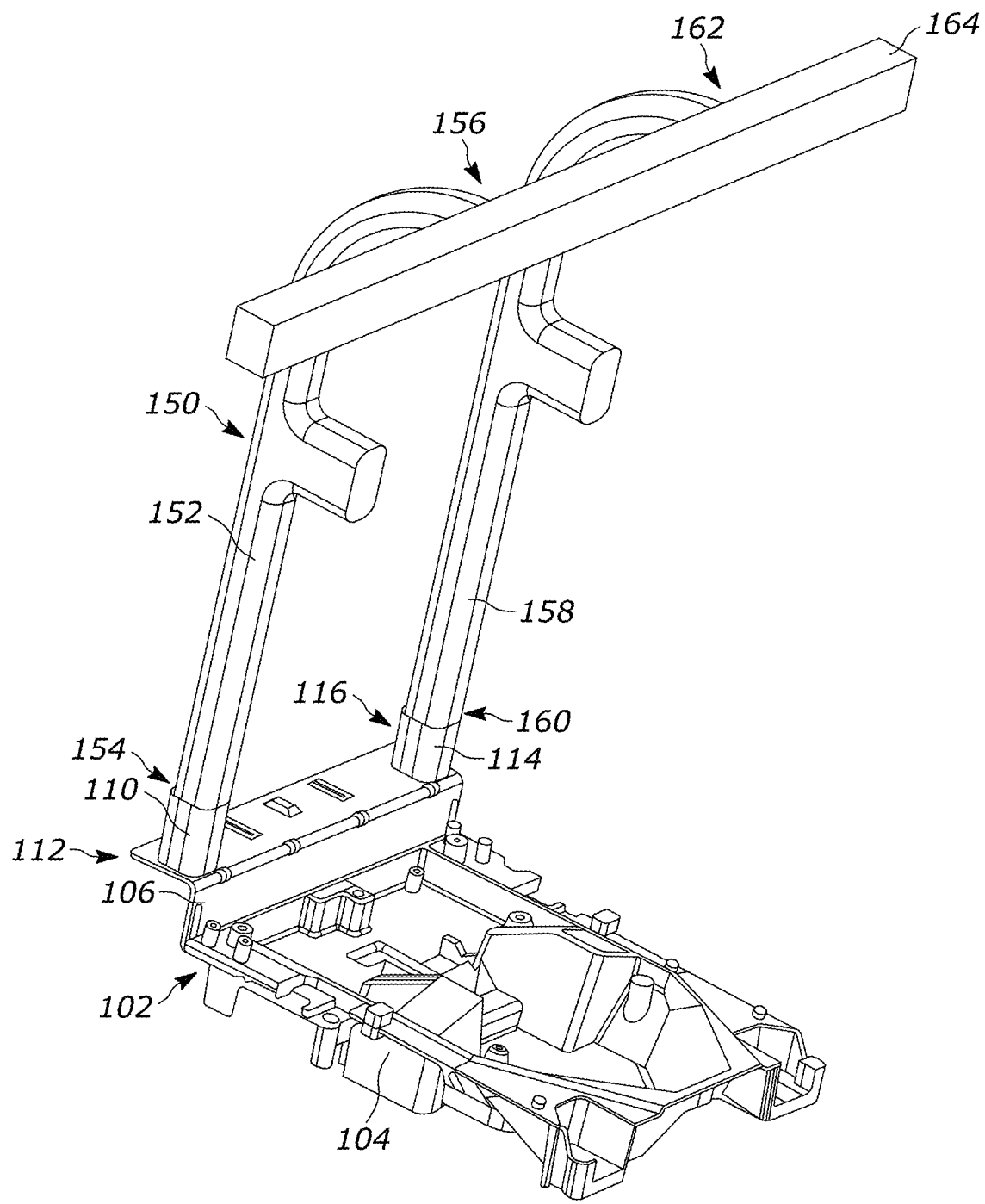
FIG. 3 illustrates a perspective view of the perimeter frame and the accessory structure of the bioptic indicia reader assembly of FIG. 1.

Skilled artisans will appreciate that elements in the figures are illustrated for simplicity and clarity, have not necessarily been drawn to scale, and that details that are not necessary for an understanding of the invention or that render other details difficult to perceive may be omitted. For example, the dimensions of some of the elements in the figures may be exaggerated relative to other elements to help to improve understanding of embodiments of the present invention.

The apparatus components have been represented where appropriate by conventional symbols in the drawings, showing only those components and specific details that are pertinent to understanding the examples of the present invention so as not to obscure the disclosure with details that will be readily apparent to those of ordinary skill in the art having the benefit of the description herein.

DETAILED DESCRIPTION

The example bioptic indicia reader assemblies disclosed herein include an accessory structure that can include/support various components above the bioptic indicia reader, such as vision cameras, barcode reading cameras, RFID readers, displays, a host computer, payment terminals, receipt printers, etc., without affecting the footprint of the bioptic indica reader, so that the requirements for installation of the bioptic indicia reader into a workstation are not affected.

The example bioptic indicia reader assemblies include an accessory structure that is secure at two corners of a rigid frame, within the footprint of the rigid frame, and extends above the bioptic indicia reader. Securing the accessory structure to at least two corners of the rigid frame provides support for larger and heavy modules to be installed on the accessory structure, resists twisting or torque, anchors the accessory structure to the center of mass of the bioptic indicia reader and rigid frame (which are fixed in a recess in a counter), and provides more space for wires to be routed through the accessory structure. The accessory structure can include vision cameras and/or barcode cameras that look downward toward the bioptic indicia reader and/or toward areas surrounding the bioptic indicia reader and has space for a display/monitor of reasonable size (e.g., 10 inches or more tall) to be mounted to the accessory structure above the bioptic indicia reader. Additional accessories, such as ethernet adapters, video upgrade modules, RFID readers, receipt printers, payment modules, etc., can also be mounted to the accessory structure.

Referring to FIGS. 1-6, a first example of a bioptic indicia reader assembly 100 is illustrated that can be configured to be supported by a workstation 400, such as a checkout counter at a point-of-sale (POS) of a retail store. Bioptic indicia reader assembly 100 generally includes a perimeter frame 102, a bioptic indicia reader 120 positioned within and supported by perimeter frame 102, and a first example of an accessory structure 150. In some implementations, bioptic indicia reader assembly 100 could also include a sheet metal frame 194 secured to perimeter frame 102, a scale assembly (not shown) positioned between bioptic indicia reader 120 and sheet metal frame 194, and a platter 196, which can be positioned over and engage the scale assembly to allow objects placed on platter 196 to be weighed by the scale assembly, if used. Sheet metal frame 194 can be a single, unitary, integral part or can include multiple parts that are assembled together, as shown.

In the example shown, bioptic indicia reader 120 is a bioptic barcode reader, such as the Zebra® MP7200 bioptic barcode reader, but can be any type of indicia reader desired, such as a single window barcode reader, a radio-frequency identification reader, etc. Bioptic indicia reader 120 has a housing 124 that includes a lower housing portion 126 and an upper housing portion 128 that extends above lower housing portion 126. A generally horizontal window 132 can be positioned in lower housing portion 126 to allow a set of optical components positioned within housing 124 to direct at least a portion of a field-of-view through horizontal window 132 and a generally upright window 134 can be positioned in upper housing portion 128 to allow the set of optical components to direct at least a portion of a field-of-view through upright window 134. The fields-of-view directed through horizontal window 132 and upright window 134 intersect to define a product scanning region 402, where an object can be scanned for sale at the POS.

Perimeter frame 102 generally includes a chassis 104, which can be die cast, and a rear flange 106. Chassis 104 and rear flange 106 of perimeter frame 102 can be a single, unitary, integral part or, as shown, can be individual parts that are secured together. Perimeter frame 102 can provide structure and support to bioptic indicia reader 120 and accessory structure 150.

In the example shown, accessory structure 150 generally includes a first post 152 that is generally vertically oriented, a second post 158 that is generally vertically oriented and spaced apart from first post 152, and an accessory crossbar 164 that extends over bioptic indicia reader 120 and transverse to first post 152 and second post 158. As used herein, the term vertically oriented means primarily directed or oriented in an upward direction. Vertically oriented can be at an angle to a horizontal plane (e.g., platter 196) and can be, but does not have to be, perpendicular to the horizontal plane.

Figure 4:
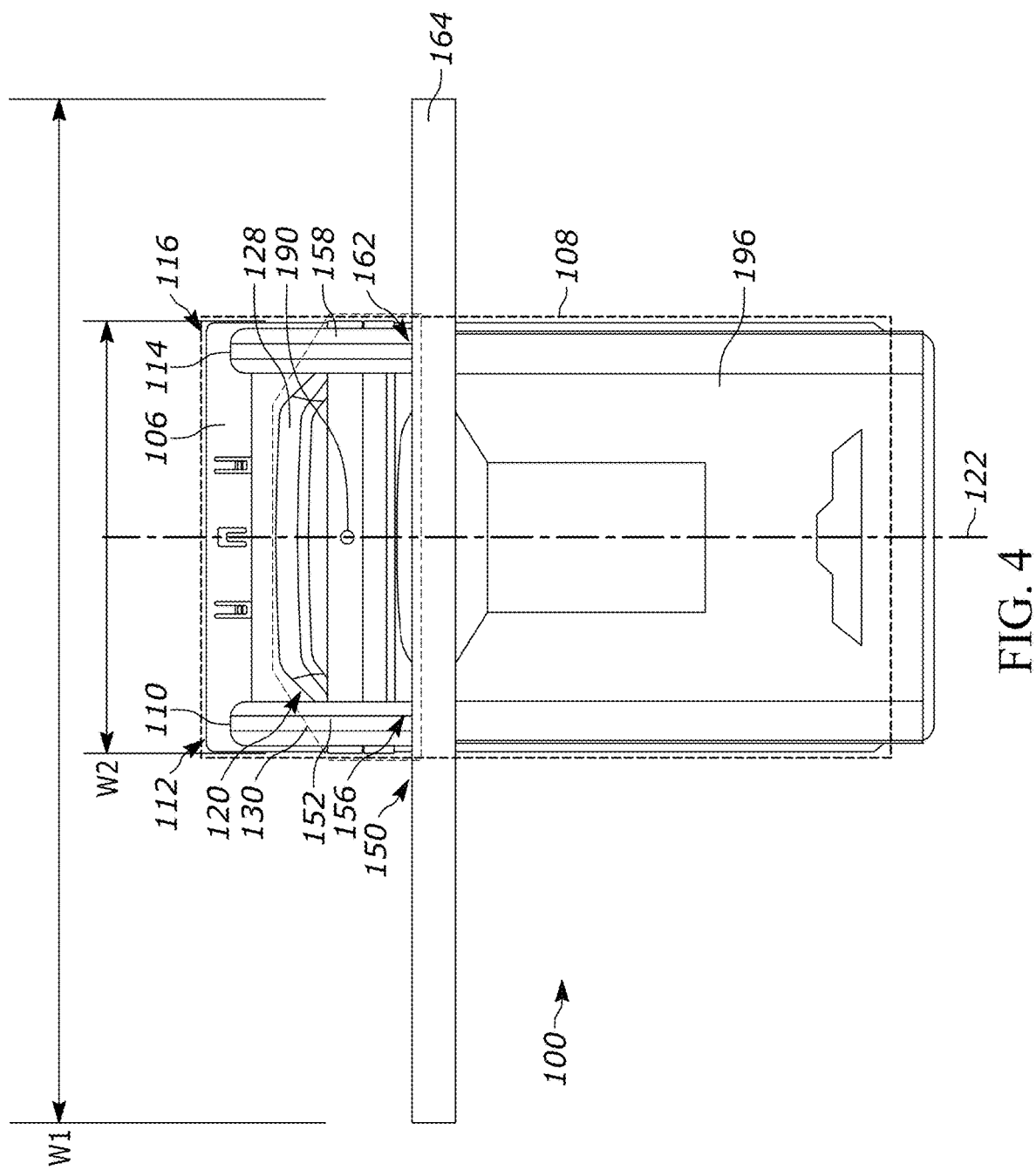
FIG. 4 illustrates a top view of the bioptic indicia reader assembly of FIG. 1.
Figure 5:
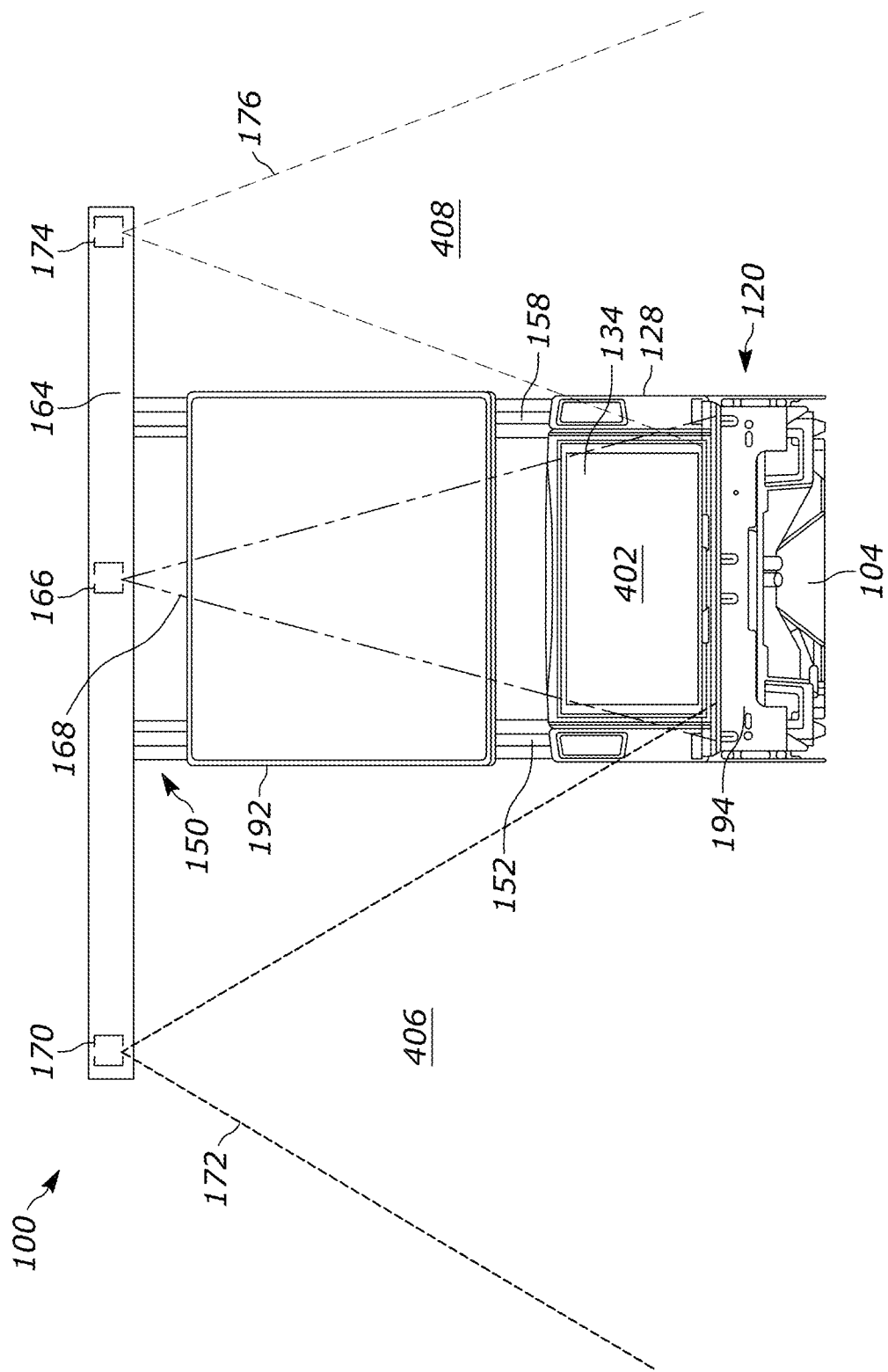
FIG. 5 illustrates a front view of the bioptic indicia reader assembly of FIG. 1.
Figure 6:
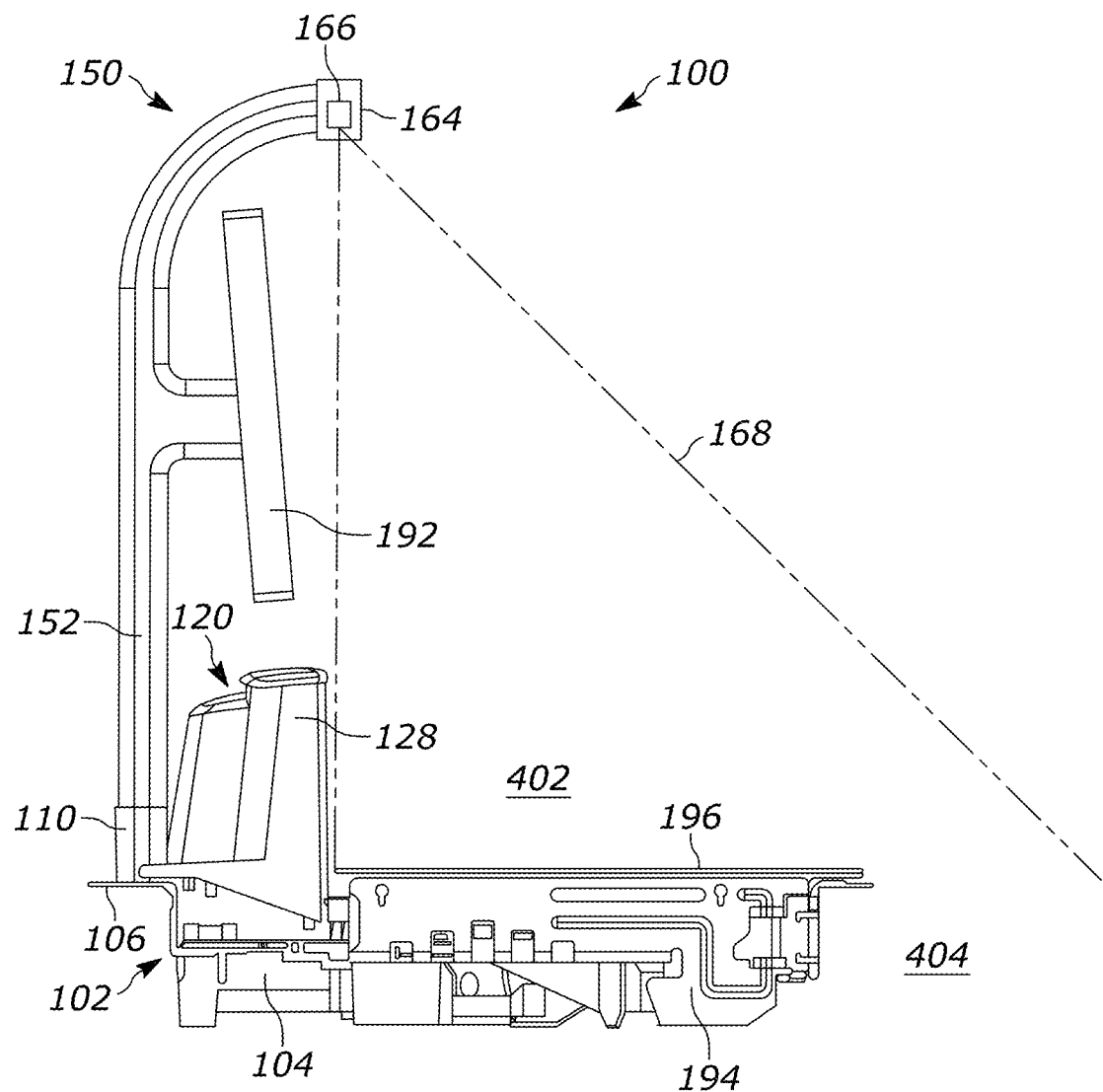
FIG. 6 illustrates a side view of the bioptic indicia reader assembly of FIG. 1.

First post 152 has a proximal end 154 that is configured to be removably secured to perimeter frame 102 and a distal end 156 that is secured to accessory crossbar 164. Similarly, second post 158 has a proximal end 160 that is configured to be removably secured to perimeter frame 102 and a distal end 162 that is secured to accessory crossbar 164. Proximal end 154 of first post 152 is received in a first socket 110 formed at a first corner 112 of perimeter frame 102 and proximal end 160 of second post 158 is received in a second socket 114 formed at a second corner 116 of perimeter frame 102, such that proximal end 154 of first post 152 and proximal end 160 of second post 158 are positioned within a footprint 108 of perimeter frame 102. As used herein, footprint 108 is the area occupied by perimeter frame 102 when viewed straight down from above bioptic indicia reader assembly 100. Positioning proximal end 154 of first post 152 and proximal end 160 of second post 158 within footprint 108 allows accessory structure 150 to be installed on perimeter frame 102 without affecting the installation of bioptic indicia reader assembly 100 in workstation 400. In the example shown, first socket 110 and second socket 114 are formed on rear flange 106 of perimeter frame 102. However, in other implementations, first socket 110 and second socket 114 could be formed in chassis 104 of perimeter frame 102. Securing accessory structure 150 to, at a minimum, two corners of perimeter frame 102 ensures better support of larger and heavier accessories, resists twisting or torque, and anchors accessory structure 150 to the center of mass of bioptic indicia reader 120 and perimeter frame 102, which are typically installed fixed in a recess in workstation 400. This also allows more space for wires (e.g., wires routed to display 192, wires routed to first camera 166, second post 158, and/or third camera 174, etc.) to be routed through accessory structure 150 to below workstation 400. In addition, as shown in FIG. 4, accessory structure 150 can have a center of gravity 190 that is located generally along a longitudinal centerline 122 of bioptic indicia reader 120 and within a footprint 130 of upper housing portion 128 of housing 124 of bioptic indicia reader 120. Locating center of gravity 190 in this manner provides the best mechanical integrity for perimeter frame 102 and minimizes the stresses placed on first post 152, second post 158, first socket 110, and second socket 114. As used herein, footprint 130 of upper housing portion 128 is the area occupied by upper housing portion 128 when viewed straight down from above bioptic indicia reader assembly 100.

Accessory crossbar 164 is secured to and extends transverse to first post 152 and second post 158 and can include one or more cameras, such vision cameras, barcode reading cameras, etc. In the example shown, accessory crossbar 164 includes a first camera 166 that has a first field-of-view 168 that encompasses at least a portion of product scanning region 402. First camera 166 can be a barcode reading camera and/or a vision camera and can be used as an addition camera for reading indicia, such as barcodes, on products in the product scanning region 402. First field-of-view 168 of first camera 166 can also encompass an area 404 located to a front of bioptic indicia reader assembly 100 and can be used to monitor the area in front of bioptic indicia reader assembly 100 (e.g., to detect shoplifting, product switching, etc.). In addition to, or instead of, first camera 166, accessory crossbar 164 can have a second camera 170 that is positioned at a first end of accessory crossbar 164 and has a second field-of-view 172 that encompasses an area 406 located to a side of bioptic indicia reader assembly 100 (the left side of bioptic indicia reader assembly 100 in the orientation shown in FIG. 5). Second camera 170 can be a vision camera and can be used to monitor a bagging area or shopping cart (depending on the orientation of bioptic indicia reader assembly 100 in the checkout lane). In addition to, or instead of, first camera 166 and/or second camera 170, accessory crossbar 164 can have a third camera 174 that is positioned at a second end of accessory crossbar 164, opposite the first end, and has a third field-of-view 176 that encompasses an area 408 located to a side of bioptic indicia reader assembly 100 (the right side of bioptic indicia reader assembly 100 in the orientation shown in FIG. 5). Third camera 174 can be a vision camera and can be used to monitor the other of the shopping cart or bagging area (depending on the orientation of bioptic indicia reader assembly 100 in the checkout lane), opposite the area monitored by second camera 170. An overall width W1 of accessory structure 150 can be greater than an overall width W2 of bioptic indicia reader 120 such that accessory crossbar 164 extends outside of footprint 108 of perimeter frame 102, which can enable second camera 170 and third camera 174 to monitor the areas to the sides of bioptic indicia reader assembly 100.

In some implementations, accessory structure 150 can also have a display 192 mounted to accessory structure 150, for example, to first post 152 and/or second post 158, to a crossbar between first post 152 and second post 158, to a VESA mount mounted on accessory structure 150, etc. Display 192 can be any appropriate size desired (e.g., 10 inches or taller) and can be positioned above bioptic indicia reader 120. By attaching display 192 to accessory structure 150, which is secured to perimeter frame 102, the location of display 192 can be controlled so as to not accidentally throw off the weight on the scale assembly by touching platter 196. In addition to, or instead of, display 192, other peripherals, such as payment terminals, receipt printers, ethernet adapters, video upgrade modules, RFID readers, etc., could also be mounted to or included in accessory structure 150.

Figure 7:
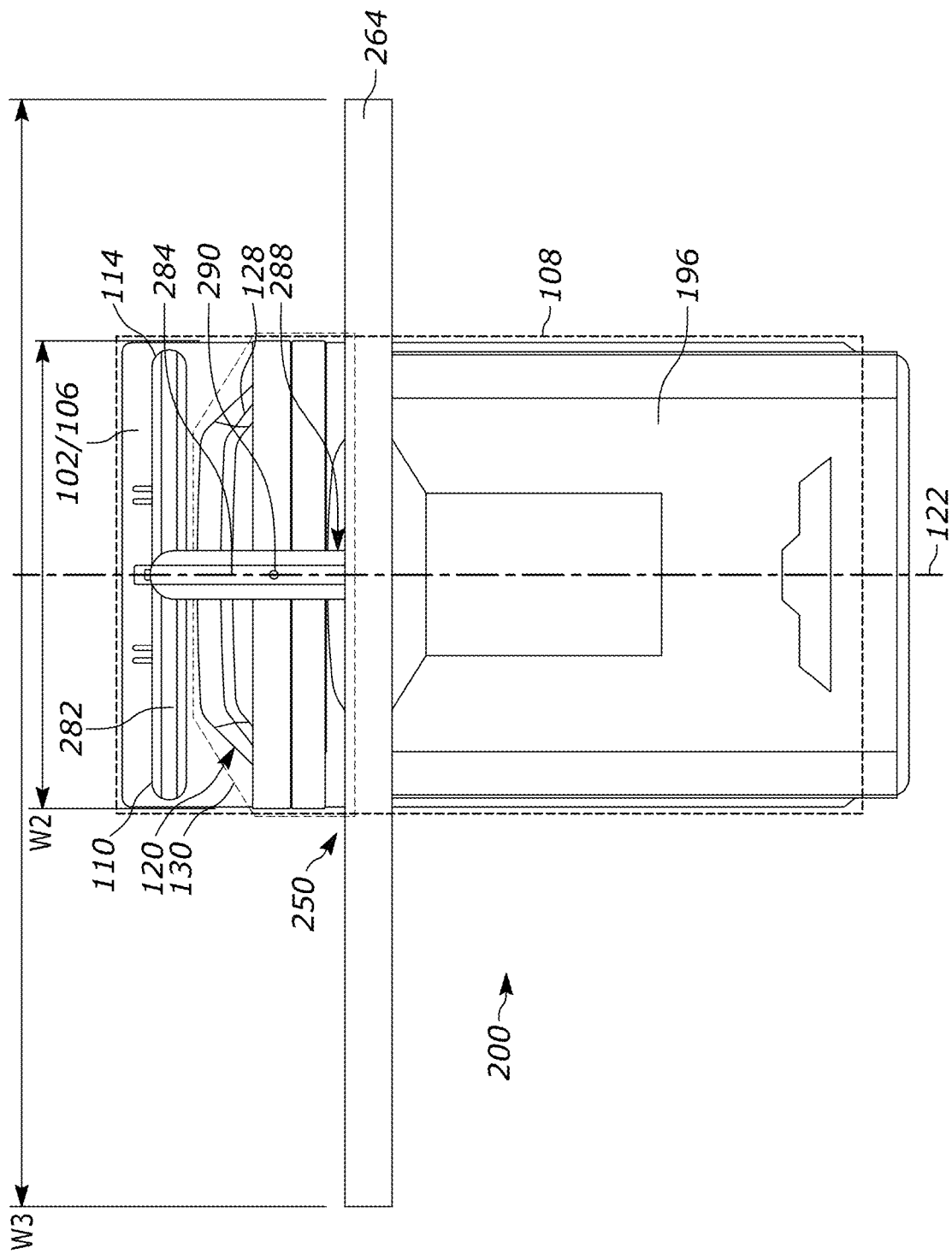
FIG. 7 illustrates a top view of a second example bioptic indicia reader assembly with a second example accessory structure.
Figure 8:
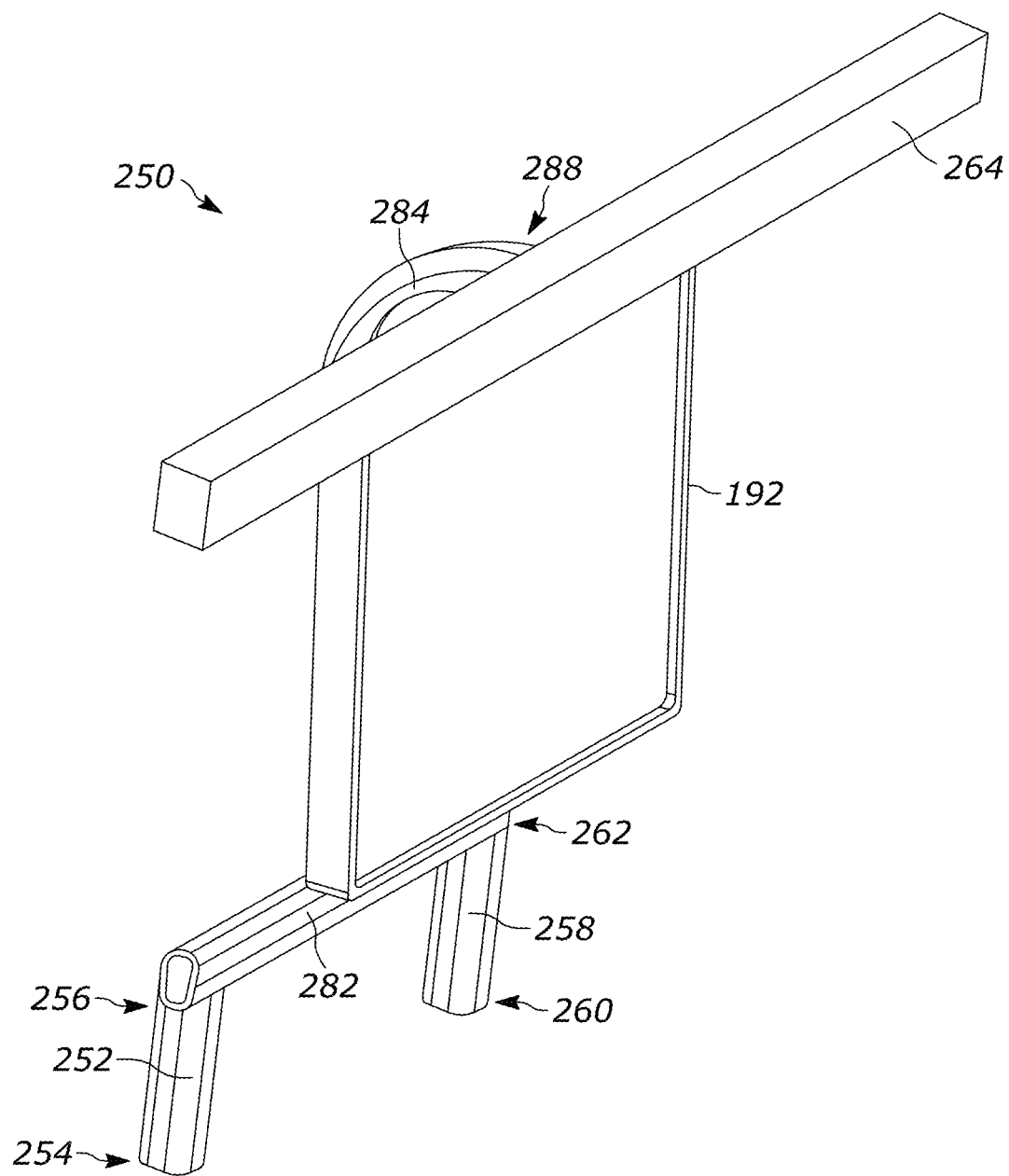
FIG. 8 illustrates a perspective view of the accessory structure of the bioptic indicia reader assembly of FIG. 7.
Figure 9:
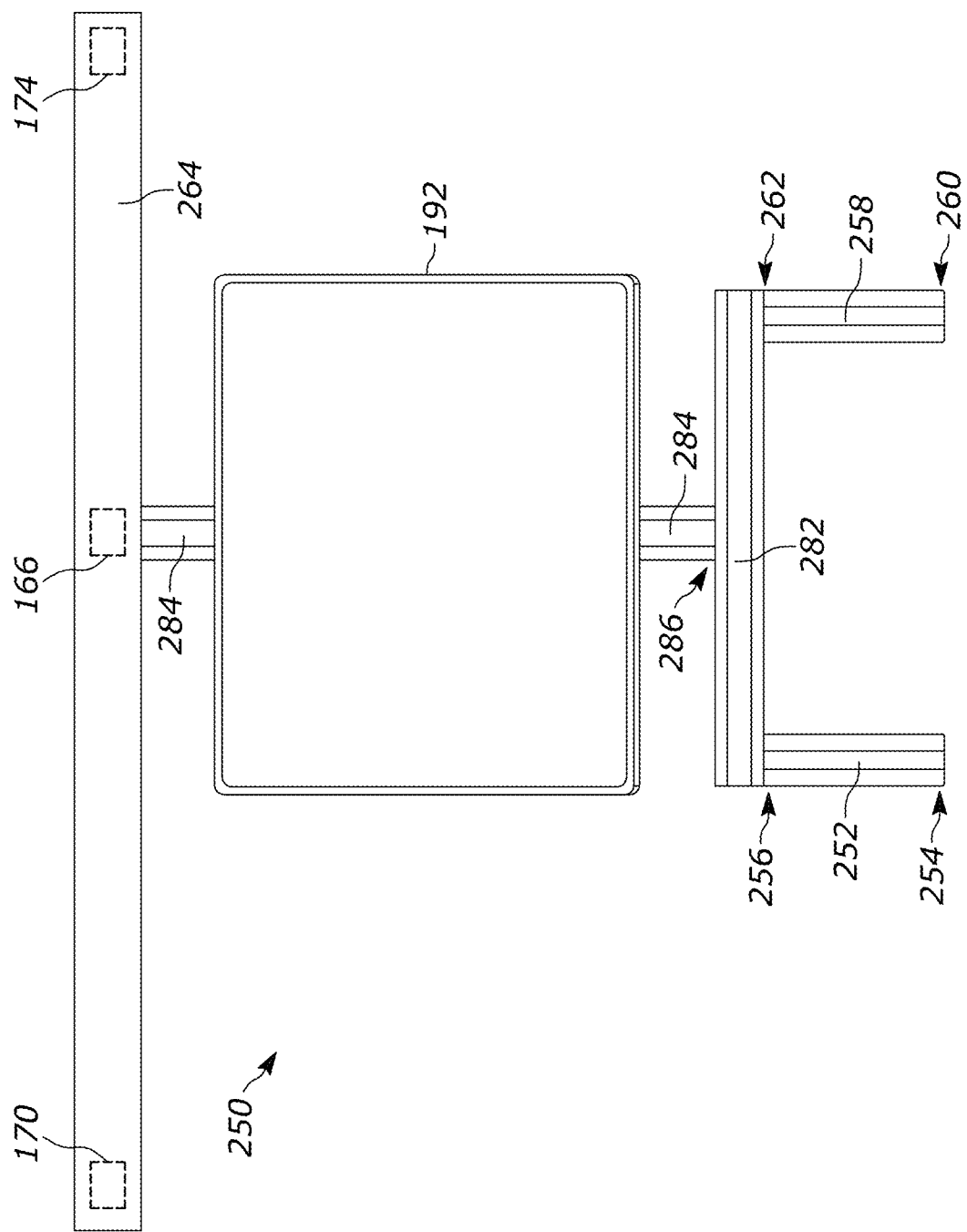
FIG. 9 illustrates a front view of the accessory structure of the bioptic indicia reader assembly of FIG. 7.

Referring to FIGS. 7-9, a second example of a bioptic indicia reader assembly 200 is illustrated that can be configured to be supported by workstation 400. Bioptic indicia reader assembly 200 generally includes perimeter frame 102 and bioptic indicia reader 120, as discussed above, and a second example of an accessory structure 250.

In the example shown, accessory structure 250 generally includes a first post 252 that is generally vertically oriented, a second post 258 that is generally vertically oriented and spaced apart from first post 252, a crossbar 282 that extends between and is secured to a distal end 256 of first post 252 and a distal end 262 of second post 258, a third post 284 that is generally vertically oriented and extends from crossbar 282, and an accessory crossbar 264 that extends over bioptic indicia reader 120 and transverse to third post 284. Third post 284 has a proximal end 286 that is secured to crossbar 282 and a distal end 288 that is secured to accessory crossbar 264.

In other implementations, rather than having crossbar 282, first post 252 and second post 258 can each extend at an angle, or can be arcuate, such that distal end 256 of first post 252 and distal end 262 of second post 258 come together at a predetermined height above perimeter frame 102 and can be joined together. Third post 284 can then be secured to and extend from the intersection of first post 252 and second post 258. The predetermined height at which first post 252 and second post 258 come together can be any appropriate height desired, such as below or above a top of upper housing portion 128 of bioptic indicia reader 120.

First post 252 has a proximal end 254 that is configured to be removably secured to perimeter frame 102 and a distal end 256 that is secured to crossbar 282. Similarly, second post 258 has a proximal end 260 that is configured to be removably secured to perimeter frame 102 and a distal end 262 that is secured to crossbar 282. Proximal end 254 of first post 252 is received in first socket 110 of perimeter frame 102 and proximal end 260 of second post 258 is received in second socket 114 of perimeter frame 102, such that proximal end 254 of first post 252 and proximal end 260 of second post 258 are positioned within footprint 108 of perimeter frame 102. In the example shown, first socket 110 and second socket 114 are formed on rear flange 106 of perimeter frame 102. However, in other implementations, first socket 110 and second socket 114 could be formed in chassis 104 of perimeter frame 102. In addition, as shown in FIG. 7, accessory structure 250 can have a center of gravity 290 that is located generally along longitudinal centerline 122 of bioptic indicia reader 120 and within footprint 130 of upper housing portion 128 of housing 124 of bioptic indicia reader 120. Locating center of gravity 290 in this manner provides the best mechanical integrity for perimeter frame 102 and minimizes the stresses placed on first post 152, second post 158, first socket 110, and second socket 114.

Accessory crossbar 264 is secured to distal end 288 of third post 284, extends transverse to third post 284, and can include one or more of first camera 166, second camera 170, and/or third camera 174, as discussed above An overall width W3 of accessory structure 250 can be greater than overall width W2 of bioptic indicia reader 120 such that accessory crossbar 264 extends outside of footprint 108 of perimeter frame 102, which can enable second camera 170 and third camera 174 to monitor the areas to the sides of bioptic indicia reader assembly 200. In some implementations, accessory structure 250 can also include display 192 mounted to accessory structure 250, as discussed above. Display 192 can be mounted to first post 252, second post 158, crossbar 282, and/or third post 284. In addition to, or instead of, display 192, other peripherals, such as payment terminals, receipt printers, ethernet adapters, video upgrade modules, RFID readers, etc., could also be mounted to or included in accessory structure 250.

Figure 10:
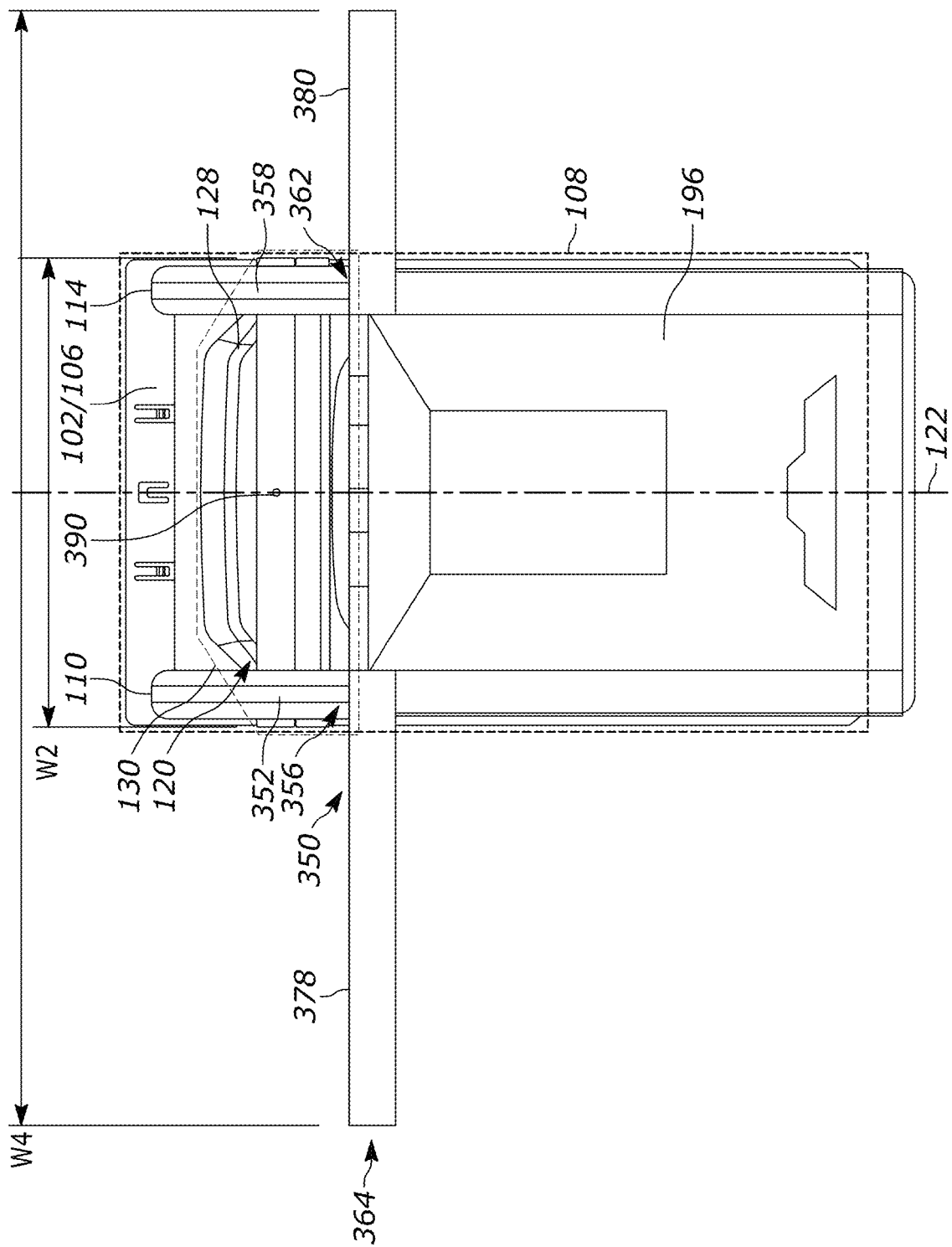
FIG. 10 illustrates a top view of a third example bioptic indicia reader assembly with a third example accessory structure.
Figure 11:
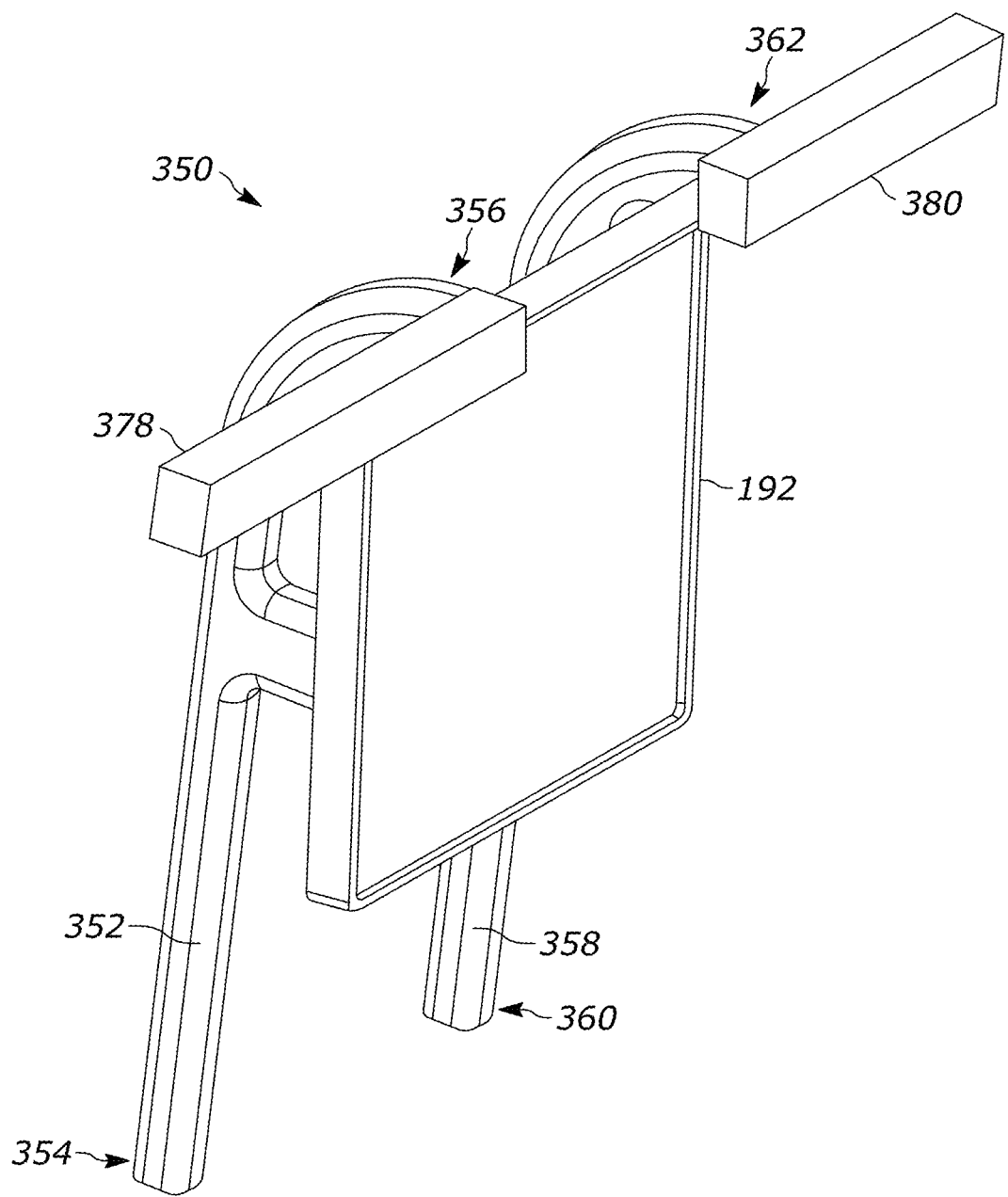
FIG. 11 illustrates a perspective view of the accessory structure of the bioptic indicia reader assembly of FIG. 10.
Figure 12:
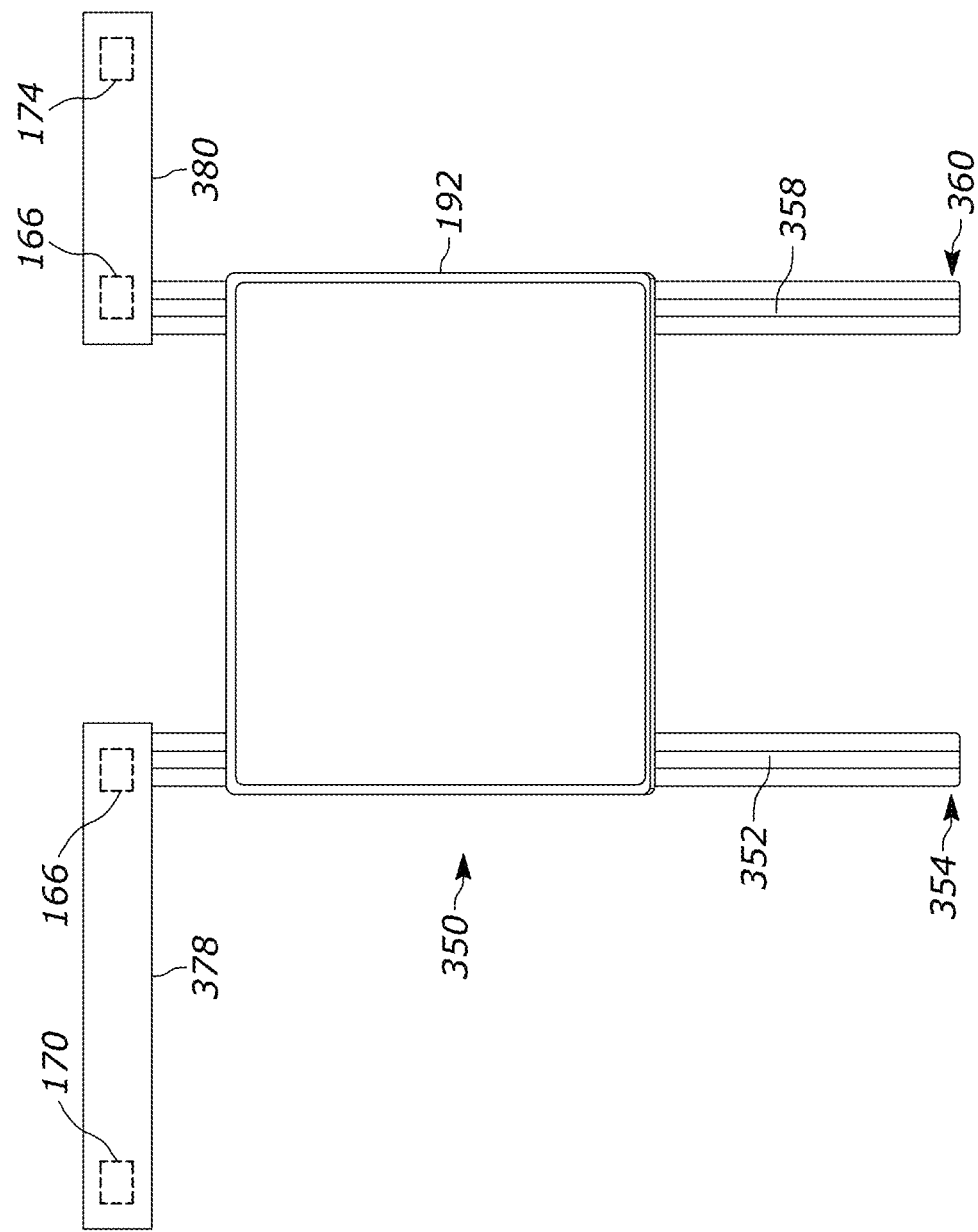
FIG. 12 illustrates a front view of the accessory structure of the bioptic indicia reader assembly of FIG. 10.

Referring to FIGS. 10-12, a third example of a bioptic indicia reader assembly 300 is illustrated that can be configured to be supported by workstation 400. Bioptic indicia reader assembly 300 generally includes perimeter frame 102 and bioptic indicia reader 120, as discussed above, and a third example of an accessory structure 350.

In the example shown, accessory structure 350 generally includes a first post 352 that is generally vertically oriented, a second post 358 that is generally vertically oriented and spaced apart from first post 352, and an accessory crossbar 364 that extends over bioptic indicia reader 120 and transverse to first post 352 and second post 358. In the example shown, accessory crossbar 364 includes a first accessory bar 378 that is secured to and extends from a distal end 356 of first post 352 and a second accessory bar 380, separate and spaced apart from first accessory bar 378, that is secured to an extends from distal end 362 of second post 358.

First post 352 has a proximal end 354 that is configured to be removably secured to perimeter frame 102 and a distal end 356 that is secured to first accessory bar 378 of accessory crossbar 364. Similarly, second post 358 has a proximal end 360 that is configured to be removably secured to perimeter frame 102 and a distal end 362 that is secured to second accessory bar 380 of accessory crossbar 364. Proximal end 354 of first post 352 is received in first socket 110 of perimeter frame 102 and proximal end 360 of second post 358 is received in second socket 114 of perimeter frame 102, such that proximal end 354 of first post 352 and proximal end 360 of second post 358 are positioned within footprint 108 of perimeter frame 102. In the example shown, first socket 110 and second socket 114 are formed on rear flange 106 of perimeter frame 102. However, in other implementations, first socket 110 and second socket 114 could be formed in chassis 104 of perimeter frame 102. In addition, as shown in FIG. 10, accessory structure 350 can have a center of gravity 390 that is located generally along longitudinal centerline 122 of bioptic indicia reader 120 and within footprint 130 of upper housing portion 128 of housing 124 of bioptic indicia reader 120. Locating center of gravity 390 in this manner provides the best mechanical integrity for perimeter frame 102 and minimizes the stresses placed on first post 152, second post 158, first socket 110, and second socket 114.

First accessory bar 378 can include first camera 166 and/or second camera 170, as discussed above, and second accessory bar 380 can include first camera 166 and/or third camera 174, as discussed above. An overall width W4 of accessory structure 350 can be greater than overall width W2 of bioptic indicia reader 120 such that first accessory bar 378 and second accessory bar 380 of accessory crossbar 364 extend outside of footprint 108 of perimeter frame 102, which can enable second camera 170 and third camera 174 to monitor the areas to the sides of bioptic indicia reader assembly 300. In some implementations, accessory structure 350 can also include display 192 mounted to accessory structure 350, as discussed above. Display 192 can be mounted to first post 352, second post 358, etc. In addition to, or instead of, display 192, other peripherals, such as payment terminals, receipt printers, ethernet adapters, video upgrade modules, RFID readers, etc., could also be mounted to or included in accessory structure 350.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A bioptic indicia reader assembly, comprising:
 a perimeter frame;
 a bioptic indicia reader positioned within and supported by the perimeter frame; and
 an accessory structure comprising a vertically oriented first post, a vertically oriented second post spaced apart from the first post, and an accessory crossbar extending over the bioptic indicia reader and transverse to the first post and the second post; wherein
 the first post and the second post each include a proximal end configured to be removably secured to the perimeter frame; and
 the proximal end of the first post and the proximal end of the second post are positioned within a footprint of the perimeter frame.

2. The bioptic indicia reader assembly of claim 1, wherein the proximal end of the first post is received in a first socket formed at a first corner of the perimeter frame and the proximal end of the second post is received in a second socket formed at a second corner of the perimeter frame.

3. The bioptic indicia reader assembly of claim 1, wherein the accessory crossbar includes a camera.

4. The bioptic indicia reader assembly of claim 3, wherein the camera has a field-of-view that encompasses at least one of: a portion of a product scanning region of the bioptic indicia reader; an area located to a side of the bioptic indicia reader assembly; and/or an area located to a front of the bioptic indicia reader assembly.

5. The bioptic indicia reader assembly of claim 1, comprising a display mounted to the accessory structure and positioned above the bioptic indicia reader.

6. The bioptic indicia reader assembly of claim 1, wherein the accessory crossbar is secured to a distal end of the first post and to a distal end of the second post.

7. The bioptic indicia reader assembly of claim 1, wherein an overall width of the accessory structure is greater than an overall width of the bioptic indicia reader and the accessory crossbar extends beyond the footprint of the perimeter frame.

8. The bioptic indicia reader assembly of claim 1, wherein the accessory structure comprises: a crossbar extending between and secured to a distal end of the first post and a distal end of the second post; and a vertically oriented third post extending from the crossbar and having a proximal end secured to the crossbar; wherein the accessory crossbar is secured to a distal end of the third post.

9. The bioptic indicia reader assembly of claim 1, wherein the accessory crossbar comprises: a first accessory bar secured to and extending from a distal end of the first post, the first accessory bar extending outside of the footprint of the perimeter frame; and a second accessory bar secured to and extending from a distal end of the second post, the second accessory bar spaced apart from the first accessory bar and extending outside of the footprint of the perimeter frame.

10. A bioptic indicia reader assembly, comprising:
a perimeter frame;
a bioptic indicia reader positioned within and supported by the perimeter frame; and
an accessory structure comprising a vertically oriented first post, a vertically oriented second post spaced apart from the first post, and an accessory crossbar extending over the bioptic indicia reader and transverse to the first post and the second post; wherein
a center of gravity of the accessory structure is located along a longitudinal centerline of the bioptic indicia reader and within a footprint of an upper housing portion of a housing of the bioptic indicia reader.

11. The bioptic indicia reader assembly of claim 10, wherein: the first post and the second post each include a proximal end configured to be removably secured to the perimeter frame; and the proximal end of the first post and the proximal end of the second post are positioned within a footprint of the perimeter frame.

12. The bioptic indicia reader assembly of claim 11, wherein the proximal end of the first post is received in a first socket formed at a first corner of the perimeter frame and the proximal end of the second post is received in a second socket formed at a second corner of the perimeter frame.

13. The bioptic indicia reader assembly of claim 10, wherein the accessory crossbar includes a camera.

14. The bioptic indicia reader assembly of claim 13, wherein the camera has a field-of-view that encompasses at least one of: a portion of a product scanning region of the bioptic indicia reader; an area located to a side of the bioptic indicia reader assembly; and/or an area located to a front of the bioptic indicia reader assembly.

15. The bioptic indicia reader assembly of claim 10, comprising a display mounted to the accessory structure and positioned above the bioptic indicia reader.

16. The bioptic indicia reader assembly of claim 10, wherein the accessory crossbar is secured to a distal end of the first post and to a distal end of the second post.

17. The bioptic indicia reader assembly of claim 10, wherein the accessory crossbar extends beyond the footprint of the perimeter frame.

18. The bioptic indicia reader assembly of claim 10, wherein the accessory structure comprises: a crossbar extending between and secured to a distal end of the first post and a distal end of the second post; and a vertically oriented third post extending from the crossbar and having a proximal end secured to the crossbar; wherein the accessory crossbar is secured to a distal end of the third post.

19. The bioptic indicia reader assembly of claim 10, wherein the accessory structure comprises: a first accessory bar secured to and extending from a distal end of the first post, the first accessory bar extending outside of the footprint of the perimeter frame; and a second accessory bar secured to and extending from a distal end of the second post, the second accessory bar spaced apart from the first accessory bar and extending outside of the footprint of the perimeter frame.

20. A bioptic indicia reader assembly, comprising:
a perimeter frame;
a bioptic indicia reader positioned within and supported by the perimeter frame; and
an accessory structure comprising a vertically oriented first post, a vertically oriented second post spaced apart from the first post, and an accessory crossbar extending over the bioptic indicia reader and transverse to the first post and the second post; wherein
an overall width of the accessory structure is greater than an overall width of the bioptic indicia reader.

21. The bioptic indicia reader assembly of claim 20, wherein: the first post and the second post each include a proximal end configured to be removably secured to the perimeter frame; and the proximal end of the first post and the proximal end of the second post are positioned within a footprint of the perimeter frame.

22. The bioptic indicia reader assembly of claim 21, wherein the proximal end of the first post is received in a first socket formed at a first corner of the perimeter frame and the proximal end of the second post is received in a second socket formed at a second corner of the perimeter frame.

23. The bioptic indicia reader assembly of claim 20, wherein the accessory crossbar includes a camera.

24. The bioptic indicia reader assembly of claim 23, wherein the camera has a field-of-view that encompasses at least one of: a portion of a product scanning region of the bioptic indicia reader; an area located to a side of the bioptic indicia reader assembly; and/or an area located to a front of the bioptic indicia reader assembly.

25. The bioptic indicia reader assembly of claim 20, comprising a display mounted to the accessory structure and positioned above the bioptic indicia reader.

26. The bioptic indicia reader assembly of claim 20, wherein the accessory crossbar is secured to a distal end of the first post and to a distal end of the second post.

27. The bioptic indicia reader assembly of claim 20, wherein the accessory structure comprises: a crossbar extending between and secured to a distal end of the first post and a distal end of the second post; and a vertically oriented third post extending from the crossbar and having a proximal end secured to the crossbar; wherein the accessory crossbar is secured to a distal end of the third post.

28. The bioptic indicia reader assembly of claim 20, wherein the accessory structure comprises: a first accessory bar secured to and extending from a distal end of the first post, the first accessory bar extending outside of a footprint of the perimeter frame; and a second accessory bar secured to and extending from a distal end of the second post, the second accessory bar spaced apart from the first accessory bar and extending outside of the footprint of the perimeter frame.

* * * * *